United States Patent
Gyoerke et al.

(10) Patent No.: US 11,904,260 B2
(45) Date of Patent: *Feb. 20, 2024

(54) PURGE GAS CONTAMINATE ELIMINATION DEVICE AND SYSTEM FOR A VEHICLE

(71) Applicant: KNORR-BREMSE Systeme fuer Nutzfahrzeuge GmbH, Munich (DE)

(72) Inventors: Zsombor Gyoerke, Keszthely (HU); Kornel Kantor, Kecskemet (HU); Huba Nemeth, Budapest (HU); Janos Toth, Kecskemet (HU); Zoltan Laszlo Vass, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 292 days.

This patent is subject to a terminal disclaimer.

(21) Appl. No.: 17/292,108

(22) PCT Filed: Oct. 21, 2019

(86) PCT No.: PCT/EP2019/078540
§ 371 (c)(1),
(2) Date: May 7, 2021

(87) PCT Pub. No.: WO2020/094374
PCT Pub. Date: May 14, 2020

(65) Prior Publication Data
US 2021/0394086 A1   Dec. 23, 2021

(30) Foreign Application Priority Data
Nov. 8, 2018   (EP) .................................... 18205258

(51) Int. Cl.
*B01D 17/04*   (2006.01)
*B01D 3/34*   (2006.01)
(Continued)

(52) U.S. Cl.
CPC ........... *B01D 17/042* (2013.01); *B01D 3/346* (2013.01); *B01D 17/045* (2013.01);
(Continued)

(58) Field of Classification Search
None
See application file for complete search history.

(56) References Cited

U.S. PATENT DOCUMENTS

| 3,810,346 A | 5/1974 | Uratani |
| 2009/0101592 A1 | 4/2009 | Anderson et al. |
| 2010/0024654 A1 | 2/2010 | Shaw et al. |

(Continued)

FOREIGN PATENT DOCUMENTS

| CN | 1944289 A | 4/2007 |
| CN | 101160161 A | 4/2008 |

(Continued)

OTHER PUBLICATIONS

International Search Report (PCT/ISA/210) issued in PCT Application No. PCT/EP2019/078540 dated Nov. 20, 2019 (three (3) pages).

(Continued)

*Primary Examiner* — Krishnan S Menon
(74) *Attorney, Agent, or Firm* — Crowell & Moring LLP

(57) ABSTRACT

A device for separating a fluid component from a fluid, in particular compressed air of a vehicle, is provided. The device has a first container for containing the fluid, the first container being arranged to separate at least a part of one or more components contained in the fluid from the fluid by evaporation. The first container includes one or more openings through which a substance can be supplied to the fluid in the first container for breaking an emulsion or mixture of two or more components contained in the fluid and an exhaust through which the at least part of the one or more separated components can be exhausted.

14 Claims, 8 Drawing Sheets

(51) Int. Cl.
*B01D 46/00* (2022.01)
*B01D 46/54* (2006.01)
*F04B 39/16* (2006.01)

(52) U.S. Cl.
CPC ....... *B01D 46/0031* (2013.01); *B01D 46/543* (2013.01); *F04B 39/16* (2013.01)

(56) References Cited

U.S. PATENT DOCUMENTS

| | | | |
|---|---|---|---|
| 2015/0258492 A1* | 9/2015 | Nishihara | B01D 53/0415 55/432 |
| 2017/0209831 A1 | 7/2017 | Sugio et al. | |
| 2017/0282093 A1 | 10/2017 | Rusch et al. | |
| 2021/0394087 A1* | 12/2021 | Gyoerke | B01D 17/045 |
| 2021/0394105 A1* | 12/2021 | Gyoerke | B01D 46/543 |

FOREIGN PATENT DOCUMENTS

| | | |
|---|---|---|
| CN | 101208144 A | 6/2008 |
| CN | 101653666 A | 2/2010 |
| CN | 104405622 A | 3/2015 |
| CN | 106794384 A | 5/2017 |
| DE | 2 243 448 A1 | 9/1973 |
| DE | 10 2014 217 226 A1 | 3/2016 |
| DE | 11 2015 002 490 T5 | 2/2017 |
| GB | 2 425 069 A | 10/2006 |
| JP | H07104 78 U * | 2/1995 |
| JP | 11-343976 A | 12/1999 |
| JP | 2003-24706 A | 1/2003 |
| JP | 2011-7171 A | 1/2011 |
| WO | WO 2004/036048 A1 | 4/2004 |
| WO | WO 2006/109096 A2 | 10/2006 |

OTHER PUBLICATIONS

Written Opinion (PCT/ISA/237) issued in PCT Application No. PCT/EP2019/078540 dated Nov. 20, 2019 (five (5) pages).
Chinese-language Office Action issued in Chinese Application No. 201980088406.0 dated Mar. 23, 2022 with English translation (20 pages).

* cited by examiner

PURGE GAS CONTAMINATE ELIMINATION DEVICE AND SYSTEM FOR A VEHICLE

BACKGROUND AND SUMMARY OF THE INVENTION

The present invention relates to a purge gas contaminate elimination device and system for a vehicle. A modern vehicle comprises a compressor with a discharge line which feeds an airdryer which primarily supplies the vehicle brake system and other consumers. Today compressors in vehicles are oil lubricated. Therefore, besides compressed air gaseous and condensed liquid oil droplets are delivered by the compressor. This oil is cyclically exhausted by the airdryer through its exhaust port together with purge air. The purge air also includes a large amount of gaseous and liquid water which is also exhausted to the environment. According to common experience the content of water can be two to three times larger than the content of oil. This means that the amount of exhausted water during a vehicle maintenance period can be as much as one to two litres. Oil catchers have been provided in conventional vehicles to eliminate oil from the purge air. For example, an oil catcher can comprise a 5 μm filter which separates liquids like oil and water droplets from the purge air. While a filter housing provides a temporary storing function for a mixture of water and oil, a drain cock can be provided to drain the water and oil mixture from the device. Disadvantages of this device are that it has a low oil filtering efficiency and that liquid oil droplets are partially collected only. Also frequent draining of the waste storage of the device is needed.

It is the object of the present application to provide an improved purge gas contaminate elimination device for a vehicle which permits to avoid the shortcomings of conventional oil catchers.

The object is achieved with a device, system and method for separating a fluid component from a fluid, in particular, compressed air of a vehicle, having the features of independent claims. Embodiments of the claimed subject matter are described in the dependent claims.

According to the application a device for separating a fluid component from a fluid, in particular compressed air of a vehicle, comprises a first container for containing the fluid, the first container being arranged to separate at least a part of one or more components contained in the fluid from the fluid by evaporation, wherein the first container comprises one or more openings through which a substance can be supplied to the fluid in the first container for breaking an emulsion or mixture of two or more components contained in the fluid, and an exhaust through which the at least part of the one or more separated components can be exhausted.

The device provides an efficient separation of at least a part of one or several, in particular, liquid components contained in a fluid such as compressed air supplied from a compressor or air treatment unit including an air dryer of a vehicle which are difficult to separate with conventional means such as a filter. The device operates very efficient in a vehicle system in which a fluid component that needs to be separated and has a lower evaporation temperature or boiling point than one or more other components that are to remain in the fluid, like for example water contained in a mixture with oil as included in compressed air from a compressor or air treatment unit of a vehicle. By supplying to the first container a substance for breaking an emulsion or mixture of two or more components contained in the fluid the surface between the liquid and gaseous components of the fluid can be increased and evaporation of at least one of the components contained in the fluid can be enhanced. This allows reduction of the size of the device in general and particularly of the first container as the surface between the liquid and gaseous components of the fluid can be increased by the emulsion or mixture breaking substance without increasing the first container.

The substance supplied to the first container having an emulsion or mixture breaking effect to an emulsion or mixture of two or more components of the fluid in the first container and can be or comprise a gas, a liquid or a solid or a combination thereof. The gas can be air or another gas including $O_2$, $CO_2$, $H_2$ etc. The liquid or solid can consist of or comprise $CA(OH)_2$ or $AlOH$. The gas can be pressurized and can be supplied from a vehicle unit such as a compressor, air treatment unit or air dryer. The one or more openings in the first container can have a diameter such that a transfer of a substance, in particular, a gaseous substance through them causes the generation of bubbles in the fluid.

According to an embodiment the first container comprises a heating device configured to increase the temperature of the fluid in order to enhance evaporation of the one or more components from the fluid. The heating device can be controllable to maintain the temperature of the fluid above a threshold temperature such as a specific or pre-selected threshold temperature or in a temperature range such as a specific or pre-selected temperature range, in particular, above a first temperature and below a second temperature depending on the one or more components in the fluid that are to be evaporated and their evaporation temperatures and rates. In particular, the temperature range is determined in a way that the evaporation rate of the fluid component that is to be separated such as water is sufficiently high, but at the same time the evaporation rate of the one or more components that should remain in the fluid such as oil is low enough to avoid its evaporation and a related contamination of the environment. A suitable temperature for separating water from a fluid which comprises oil can be in a range between 50° and 90° C., in particular, 50° C., 60° C., 70° C., 80° C. or 90° C. However, in principle, the device can also be operated at lower or higher temperatures. It can be considered to control the pressure in the container, for example, to increase the pressure in the container and exhaust an evaporated fluid component at pre-determined time intervals.

The heating device may include a bimetallic switch or a temperature sensor connected with the first container and being arranged to control, in particular, to switch on or off the heating device as a function of temperature of the fluid, in particular, if the temperature of the fluid increases above the first temperature or decreases below the second temperature. The heating device may be connected to a battery of a vehicle for power supply. The heating device may be connected to a vehicle unit such as an air treatment unit including an air dryer unit of the vehicle and arranged to be controlled, in particular, switched on or off by the vehicle unit or corresponding to operation of the vehicle unit.

According to an embodiment the heating device includes one or more of an electrical heating device or a heat exchanger for conducting a fluid such as a gas or a liquid to the first container, the heat exchanger being in contact with the first container to exchange heat with the fluid contained therein. The electrical heating device can be used as a primary heat source and the heat exchanger as a secondary heat source.

According to an embodiment the heat exchanger comprises a fluid connection such as a tube for conducting heat from a vehicle unit generating heat to the heat exchanger.

The vehicle unit generating the heat can be for example a compressor or an engine of a vehicle.

According to an embodiment the heat exchanger or the device comprises a valve being arranged to be switched between at least two states including a state in which heat supplied to the valve is conducted to the heat exchanger in contact with the first container or a state in which heat supplied to the valve is conducted to another heat exchanger or an exhaust.

According to an embodiment the device comprises a means for actuating the valve including an electric motor or a wax motor so that heat can be supplied to the heat exchanger in contact with the first container.

According to an embodiment the device comprises a means for determining a level of the fluid in the first container. The means for determining the level of the fluid can comprise a level sensor, a float sensor comprised in the first or second container, a sensor operating based on an estimated content of a fluid component such as oil contained in the fluid which can be determined based on air consumption or throughput of a vehicle unit such as an air treatment unit or based on a humidity sensor for determining humidity of the air introduced in the air treatment unit of the vehicle. The heating device can be controlled and switched on or off in dependence of the level of the fluid in the first or second container as determined by the means for determining the level of the fluid.

According to a further embodiment the first container comprises at least one perforated sheet, board or plate through which gas bubbles can be supplied to the fluid, the gas bubbles increasing the surface of the fluid which causes an increase of the evaporation rate of one or more components of the fluid. Furthermore, the gas will absorb the fluid component that is to be separated from the fluid when passing through the fluid and hence increase the evaporation rate of the component.

According to yet another embodiment the device further comprises a heating device for heating the substance, including gas or gas bubbles supplied to the fluid. The heated substance, including gas or gas bubbles have a higher capacity of absorbing the component that is to be separated from the fluid such as H2O, when passing through the fluid and further increase the evaporation rate of the fluid component.

According to another embodiment the device comprises a second container, the second container being arranged to separate at least a part of one or more components contained in the fluid from the fluid, the two containers being interconnected by a throttle device adapted to throttle a transfer of at least a part of the fluid from one of the containers into the other container.

The one or more fluid components separated from the fluid in the first container can be the same type of components separated from the fluid in the second container or different fluid components or the components may partly correspond.

A device including two containers provides the advantage of an sequential elimination of at least a part of several components contained in the fluid in the two containers connected to each other, wherein the throttle device between the two containers is arranged such that fluid introduced in one of the two containers can be isolated from the other container so that a propagation of physical conditions present in the one of the containers such as pressure or temperature variations that may arise when the container is connected to a supply of a fluid such as purge air from a compressor to the other container can be avoided. Hence the conditions for separating one or more components contained in the fluid introduced in the other container can be improved.

According to an embodiment the throttle device can be controlled such that the transfer of at least a part of the fluid from one of the containers to the other container is permitted or blocked. The throttle device can be periodically opened and closed to supply a quantity of fluid from one of the containers to the other container. The fluid supplied from one of the containers to the other container may have been treated before such that one or more components originally contained in the fluid have already been removed at least partly by a treatment of the fluid in the primary container or even before the introduction of the fluid in into the primary container.

The device for separating a fluid component from a fluid can be used to separate one or more fluid components from a fluid and to purify the one or more components of the fluid to a degree that the fluid components can be exhausted to the environment without contaminating the environment. The fluid to be treated in the device can be any fluid which is to be cleaned and may contain one or more different gases such as air, gaseous water or oil and one or more liquids such as water, oil, emulsions or mixtures of two or more of these components as well as solid particles. The fluid and its components may be substances which are typically included in a fluid such as pressurized purge air exhausted by a compressor, but also other fluids containing combinations of various gases, liquids, emulsions, mixtures and solid particles exhausted from devices of a vehicle such as a compressor or engine.

According to an embodiment the throttle device comprises one or more of a check valve, a drain valve, a filter, a membrane, an absorber for one or more components of the fluid, an opening in a wall or plate between the first container and the second container. The opening in the wall between the first container and the second container can be designed such that its diameter in at least one or two directions parallel to the wall reduces or increases along the thickness of the wall. The opening can have a circular, elliptic rectangular or square shape or the shape of a slit. The device can also include several openings in the wall. All of these devices can be used to avoid propagation of physical conditions present in one of the containers such as pressure or temperature fluctuations to the other of the two connected containers.

According to yet another embodiment the throttle device is adapted for an actuation in dependence of a supply of a fluid such as compressed air to one of the containers so that it is opened to supply fluid from one of the containers to the other container. This includes that the throttle device can be adapted to be actuated or opened when fluid with a certain pressure is applied to a piston of the throttle device or directly to the throttle device arranged in one of the containers or that the throttle device is adapted to be actuated when a signal triggered by a certain pressure in one of the containers is provided to the throttle device or that a control signal is delivered from a unit of the vehicle such as an air treatment unit which activates a piston of the throttle device to open or close the throttle device. The throttle device can also be adapted to be actuated or opened by an electric power supply.

According to a further embodiment the throttle device comprises a first end piece which can be brought into contact with an opening in one of the containers so that it can be opened and closed, and/or a second end piece which can be brought into contact with an opening in the other container so that it can be opened and closed, wherein the two end pieces are coupled together so that when one of the two openings is closed, the other is open.

The throttle device permits fluid to be drained from one of the containers when the first end piece is removed from the opening in the container and the opening in the container is opened and to be transferred to the other container when the second end piece is removed from the opening in the other container and the opening in the other container is opened. When at least one of the first and second end pieces closes one of the openings the one of the containers is separated or disconnected from the other container.

According to a further embodiment a void or volume for receiving at least a portion of the fluid is formed between the opening in one of the containers and the opening in the other container. The space or void can be defined by a container having the shape of a cylinder or cuboid which can be formed in a wall that separates the containers.

According to an embodiment one or both of the two containers each comprises an inlet and an outlet being arranged such that an inlet flow direction of the fluid passing through the inlet forms an angle of more than zero degrees with an outlet direction of the fluid passing through the outlet of the container for separating at least a part of one or more components from the fluid. The range of angles can be between 0 and 180°. Changing the direction of flow of the fluid in the container has the effect that for example droplets or solid particles of a fluid contained in a gas or a fluid which are entering the container may fall down to the buttom of the container due to gravity and are separated from the fluid stream. For this separation process to take place it is of advantage to provide inlets and outlets in one or several walls of the container or the top or bottom of the container so that the fluid stream forms an angle with regard to the direction of gravity to efficiently separate the droplets or solid particles from the fluid stream.

According to an embodiment one or both of the containers comprise one or more of one or more filters, one or more baffle plates arranged across a flow direction of the fluid or a spiral flow path for the fluid in which at least a part of one or more components contained in the fluid are separated from the fluid, one or both of the containers further comprising an outlet to exhaust the separated at least a part of one or more components. Preferably, the one or more filters, one or more plates arranged across the flow direction of the fluid and the spiral flow path for the fluid are provided for separating at least partly one or more liquid components or solid particles of fluid from one or more gaseous components of the fluid. The one or more filters may comprise one or more coalescence filters being configured in a way that at least on one surface of the filter droplets of one or more components of the fluid are formed which can be collected.

The one or more filters can comprise one or more layers of a filter material sheet. The thickness of the filter material sheet can be selected, for example, from a range between 0.5 and 2.0 mm. The filter material sheet can comprise or be made of a fibrous material, a web, mesh or a textile or a combination thereof without limitation to these materials. The filament diameter of the fibrous material can be selected, for example, from a range between 5 and 30 µm and the fibrous material can have a weight density in a range between 50 and 300 g/m$^2$. The filter material sheet can be made of or comprise cellulose, synthetics, plastic or metal including polipropilene, polyester, fibre glass or a combination thereof without limitation to these materials.

The one or more filters can comprise one or more layers of filter material sheet that are positioned perpendicular to the flow direction of the fluid or are arranged at an angle with respect to the flow direction of the fluid such as 25°, 30°, 45°, 50, 60° or 90°.

The one or more filters can comprise one or more layers of filter material sheet that are pleated or that are made of different materials or a combination thereof.

One or more layers of filter material sheet can be configured such that droplets of one or more components of the fluid collect on the inner or outer surface of the material sheet when the fluid traverses the filter material sheet.

The one or more filters can comprise a combination of several layers of filter material sheet including one or more pleated filter material sheets, one or more sheets of a drainage mesh and one or more coarse filter material sheets configured such that droplets of the fluid collect on the inner or outer surface of one or more of the material sheets when the fluid traverses the one or more material sheets. One or more layers of filter material sheet can comprise a drainage mesh having a mesh pitch in a range between 0.5 and 20 mm. The drainage mesh can be woven and can be made of or comprise one or more of aluminium, stainless steel, thermoplastic and can have a coating comprising teflon. The filament diameter of the drainage mesh can be in a range between 0.05 and 0.5 mm, including 0.2 mm.

The filter may have the shape of a flat or bent sheet, the shape of a cylinder, can be box-shaped or cubical or a combination thereof. The size including the diameter or height of the filter can be in a range between 100 and 200 mm, including 150 mm without limitation. The fluid may traverse the filter from the inside to the outside or from the outside to the inside of the filter. One or more layers of filter material sheet can be provided on a perforated substrate layer.

According to another embodiment one or more baffle plates can be arranged across a flow direction of the fluid in one or both of the containers. According to one embodiment several plates are arranged in parallel across a flow direction of the fluid and offset with respect to each other in a direction perpendicular to the flow direction of the fluid so that the fluid stream meanders around the baffle plates and is forced to change direction rapidly which causes droplets of one or more components of the fluid to collide with the baffle plates where they are collected and separated from the fluid.

According to a further embodiment one or both of the containers comprises at least one section having a larger diameter perpendicular to the flow of the fluid than an inlet opening of or tube connected to the respective container so that one or both of the containers comprises in the at least one portion having a larger diameter an expansion volume for the fluid entering the first or the second container, respectively, causing the volume of compressed fluid to expand when entering the expansion volume and reducing flow velocity of the fluid.

Accordingly, the fluid flow is slowed down as the cross section of the container increases. Due to the pressure change in this section of the container droplets of one or more components of the fluid are formed and fall down to the buttom of the container due to gravity where they can be collected.

According to a further embodiment one or both of the containers are arranged for containing the fluid and a substance supplied to the first or the second container by a supply means connected to the first or the second container, wherein the substance is an emulsion or mixture breaker configured to split an emulsion or mixture of two or more components included in the fluid into two or more separate components of the fluid upon contact with the substance.

The supply means can be a doser that is controlled by a controller. The controller can be a separate controller, a controller included in the air treatment unit or can be the air treatment unit. The doser can be a valve such as a check valve or a throttle.

According to a further embodiment the emulsion or mixture breaker substance comprises a gas, calcium hydroxide (Ca(OH)2) or aluminium hydroxide (AlOH), and the one or more components of the fluid comprise one or more of a hydrocarbon-containing gas, liquid, H2O containing gas, liquid, an emulsion or mixture of a hydrocarbon-containing substance and H2O, in particular oil and water containing emulsion.

According to a further embodiment one or both of the first or the second container further comprises two electrodes between which a voltage can be applied, the electrodes being arranged to generate by electrolysis an emulsion or mixture breaker substance capable to split an emulsion or mixture of two or more components included in the fluid into two or more separate components of the fluid. By applying a voltage between the electrodes which are isolated with respect to each other an electric current flows between the electrodes through the fluid causing electrolysis.

According to another embodiment one or both of the first or the second container further comprises at least one membrane arranged to separate one or more components from the fluid, the membrane being configured to let pass one or more components of the fluid and block one or more other components of the fluid, one or both of the first container or the second container further comprising an outlet to exhaust the separated one or more components passed through the membrane.

According to a further embodiment one or both of the first or the second container further comprises at least one substance configured to separate one or more components from the fluid, the substance being configured to absorb one or more components of the fluid and let pass one or more other components of the fluid, one or both of the first container or the second container further comprising an outlet to exhaust the separated one or more components passed through the substance.

According to an embodiment one or both of the first or the second container comprises at least one filter arranged to separate one or more components from the fluid, the filter being configured to hold back one or more components of the fluid and let pass one or more other components of the fluid, one or both of the first container or the second container further comprising an outlet to exhaust the separated one or more components passed through the filter.

According to another embodiment one or both of the first container or the second container comprises a drain valve that can be operated by means of a float in the first container or the second container, the float being arranged to float on the fluid and being configured to control the opening of the drain valve in dependence on the level of fluid in the first container or the second container, respectively.

According to another embodiment the device further comprises an intercooler connected to one or both of the first or the second container which is arranged to cool down a fluid before entering the first or second container, respectively.

According to an embodiment the device further comprises a controller to control one or more of a dosing or supply means for supplying a substance to one or both of the first or the second container, a mixing means for mixing the fluid in one or both of the first or the second container, a heating means for heating the fluid in one or both of the first or the second container, a drain valve for draining the fluid from one or both of the first or the second container and a supply of a gas to the fluid into one or both of the first or the second container.

According to a further embodiment the device comprises a catalytic converter. The catalytic converter is positioned in a discharge line at any point between the compressor of the vehicle and the exhaust of a separated component of the fluid, including in the first or the second container. This converter is configured to oxidize at least a part of the hydro-carbon content of the compressed air to carbon-dioxide. The formed carbon-dioxide is then exhausted to the environment as an inert gas, not harming the environment in the way the hydrocarbon component of the compressed air including gaseous oil and liquid oil would.

According to the application a system for separating a fluid component from a fluid, in particular compressed air of a vehicle, comprising a device for separating a fluid component from a fluid, in particular compressed air of a vehicle, as described above and a container for compressed air is provided. The container for compressed air can be connected to the first or second container of the device by a valve arranged to supply air to the first or second container.

According to an embodiment the system further comprises an air treatment unit connected to the device to supply air which has been treated in the air treatment unit to the device and configured to control supply of compressed air from the container for compressed air to the device as an emulsion or mixture breaking agent. The compressed air may increase the surface of one or more components contained in one of the containers of the device and break an emulsion or mixture of two or more components contained in the fluid such as water and oil.

The compressed air can be supplied to one of the containers of the device through one or more openings provided in the container in order to generate fluid bubbles.

According to an embodiment the air treatment unit is configured to control the supply of compressed air from the container for compressed air to the device as an emulsion or mixture breaking agent according to a time interval during which air treated in the air treatment unit is supplied to the device for separating one or more components.

According to the application a method of separating one or more components from a fluid, in particular compressed air, is provided comprising acts of supplying the fluid into a first container, separating at least a part of one or more components contained in the fluid from the fluid, wherein the separating includes supplying a substance for breaking an emulsion or mixture of two or more components contained in the fluid, and evaporating and exhausting at least part of the one or more components from the first container.

The method provides an efficient separation of at least a part of one or several, in particular, liquid components contained in a fluid such as compressed air supplied from a compressor or airdryer of a vehicle which are difficult to separate with conventional means such as filtering. The method is particularly efficient for separating a fluid component that needs to be separated and has a lower evaporation temperature or boiling point than one or more other components that are to remain in the fluid, like, for example, for separating water contained in a mixture with oil as included in compressed air from a compressor in a vehicle.

By supplying to the first container a substance for breaking an emulsion or mixture of two or more components contained in the fluid the surface between the liquid and gaseous components of the fluid can be increased and evaporation of one of the components contained in the fluid can be enhanced. This allows reduction of the size of the device in general and particularly of the first container as the surface between the liquid and gaseous components of the fluid can be increased by the emulsion or mixture breaking substance.

The substance supplied to the first container having an emulsion or mixture breaking effect to one or more components of the fluid in the first or the second container and can be or comprise a gas, such as air, a liquid or a solid or a combination thereof.

According to an embodiment the method comprises increasing the temperature of the fluid by heating the fluid to enhance evaporation of the one or more components from the fluid.

According to an embodiment the method comprises controlling a heating device in contact with the first container to maintain the temperature of the fluid above a specific or pre-selected threshold temperature or in a specific or pre-selected temperature range.

In particular, the temperature range is determined in a way that the evaporation rate of the fluid component that is to be separated such as water is sufficiently high, but at the same time the evaporation rate of the one or more components that are to remain in the fluid such as oil is low enough to avoid its evaporation and a related contamination of the environment.

According to a further embodiment the method further comprises supplying a gas or gas bubbles through one or more openings in the first container to the fluid to increase the surface of the fluid and the evaporation rate of one or more components of the fluid.

Gas bubbles may cause an increase of the evaporation rate of one or more components of the fluid due to an increase of the surface between the liquid components and gaseous components of the fluid. Furthermore, the gas bubbles may absorb the fluid component that is to be separated from the fluid when passing through the fluid and hence increase the evaporation rate of the component. Also a heated gas or gas bubbles may be supplied to the fluid since they have a higher capacity of absorbing the component that is to be separated from the fluid when passing through the fluid and further increase the evaporation rate of the fluid component.

According to another embodiment the method further comprises supplying the fluid into a second container, separating at least a part of one or more further components contained in the fluid from the fluid in the second container and providing a throttle device interconnecting the two containers to throttle transfer of the fluid from one of the two containers to the other container.

By the use of two connected container a sequential elimination of at least a part of several components contained in a fluid can be achieved in the two containers, wherein providing a throttle device between the containers has the effect that fluid introduced in one of the two containers and the treatment of the fluid in the container can be isolated from physical conditions in the other container such as pressure or temperature variations caused by a supply of pressurized fluid having a fluctuating pressure and/or temperature. This may increase the efficiency of the separation of one or more components from the fluid in the isolated container. Hence, the conditions for eliminating one or more components contained in the fluid in the isolated container can be improved.

According to an embodiment the method further comprises controlling the throttle device in a way that permits or blocks transfer of the fluid from one of the containers into the other container. Accordingly, a batch of fluid can be supplied periodically to one of the containers preferably after a treatment of fluid in the other container has been terminated and during the period of time when the conditions in the other container are such that little influence on the treatment process in the container to which the fluid is transferred is expected. For example, a preferable period of time for transferring fluid from one container to the other container may be a period of time when pressure in the container from which the fluid is transferred is low, in particular, below a predetermined pressure threshold in order to minimize propagation of pressurized fluid into the other container. On the other hand a pressure in the container from which the fluid is transferred may support the transfer of fluid into the other container.

According to a further embodiment the method further comprises in one or both of the containers one or more of passing the fluid through a membrane being configured to let pass one or more components of the fluid and hold back one or more other components of the fluid, passing the fluid through a filter, the filter being configured to let pass one or more components of the fluid and block or absorb one or more other components of the fluid, and passing the fluid through an absorbing substance, the absorbing substance being configured to let pass one or more components of the fluid and absorb one or more other components of the fluid, and blocking or absorbing at least partly one or more components of the fluid. These acts can be combined in order to obtain the most efficient separation of several components in the fluid.

According to a further embodiment the method further comprises providing a filter or one or more baffle plates across the flow of fluid in one or both containers and separating and exhausting at least partly one or more components of the fluid.

According to a further embodiment the method further comprises providing two electrodes in one or both of the containers and providing a power supply connected with the electrodes, supplying a fluid into in one or both of the containers, respectively, the fluid coming in contact with the electrodes, applying a voltage to the electrodes and generating by electrolysis a substance in one or both of the containers, the substance splitting an emulsion or mixture of two or more components included in the fluid into two or more separate components of the fluid, and separating one or more components from the fluid.

According to a further embodiment the method further comprises opening a drain valve provided in one or both of the containers in dependence of a fluid level of the fluid in one or both of the containers as determined by a float, respectively, and draining the fluid from one or both of the containers, respectively.

Further features and characteristics of the application result from the following description of several embodiments by means of the appended drawings.

DETAILED DESCRIPTION OF THE DRAWINGS

Figure 1:
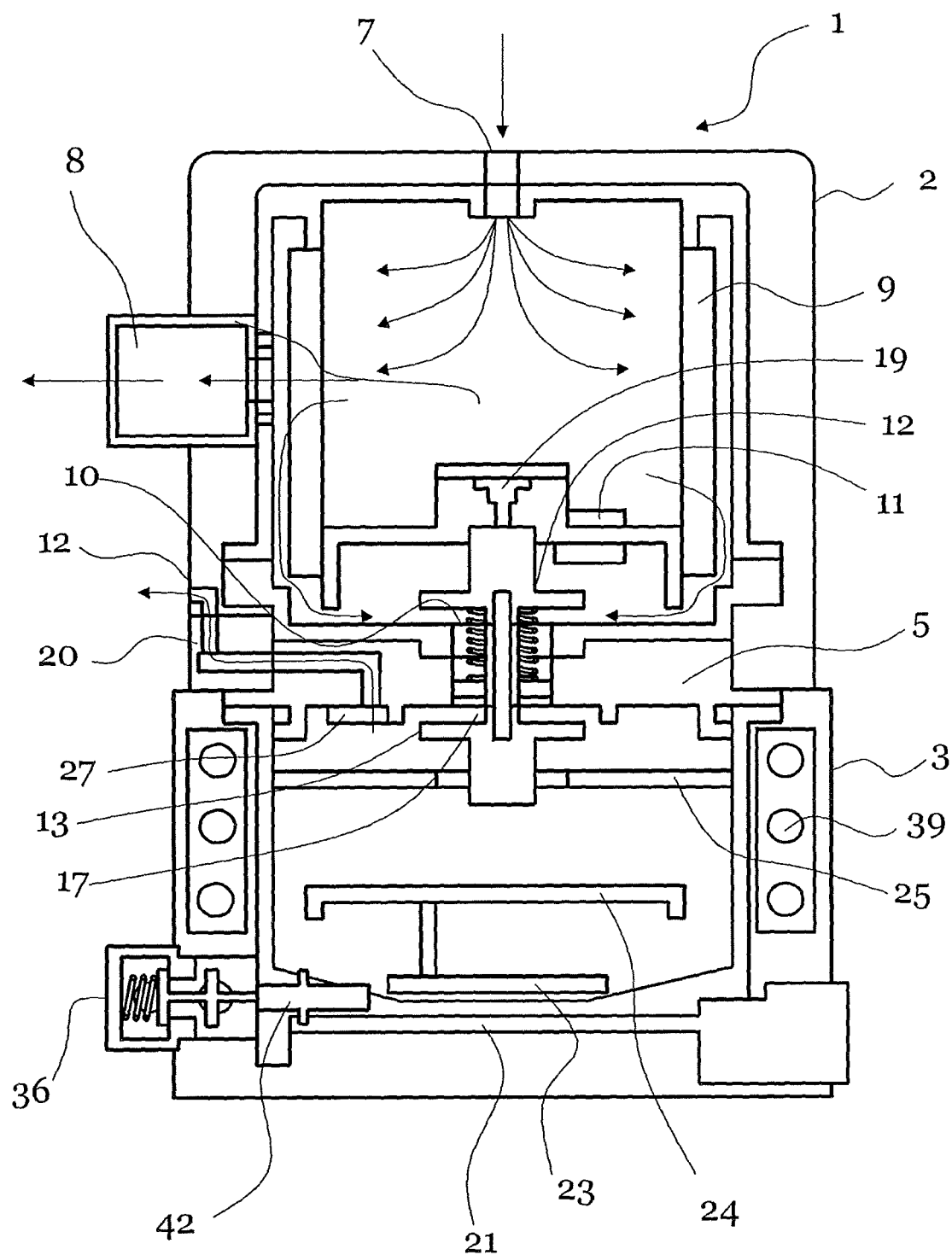
FIG. 1 shows an example of a device for separating fluid components according to a first embodiment.

Examples of a device for separating fluid components from a fluid according to different embodiments will be described in the following with reference to the figures. An example of a device for separating fluid components from a fluid according to a first embodiment as shown in FIG. 1 includes a housing 1 which comprises a first container 2 and a second container 3 that are separated by a wall or plate 5. In the wall 5 a throttle device 6 configured as a separator valve is provided. A fluid such as pressurized purge air which may comprise air, gaseous and liquid water, gaseous and liquid oil and solid particles generated in a compressor or an air treatment unit such as an air dryer connected to the device can enter the housing 1 at an intake port 7 provided at the top of the first container 2.

The first container 2 comprises a coalescence filter 9 having a cylindrical shape. A filter material sheet of the coalescence filter 9 is positioned across the air flow of the fluid which enters through the intake port 7 and then is directed towards the side wall of the filter 9. The upper and lower ends of the filter 9 are sealed with respect to the first container 2 to avoid by-passing of unfiltered fluid.

Droplets in the fluid are caught in the material sheet of the filter 9 and larger droplets of the fluid are coalesced at an outer surface of the filter 9. At least a part of these droplets move to the bottom of the first container 2 due to gravity. In case the filter 9 becomes strongly contaminated and its flow properties are diminished a filter safety by-pass valve 11 provided at the bottom of the first container 2 opens and purge air entering the first container 2 through the intake port 7 is directly exhausted through a silencer 8 connected to the safety by-pass valve 11 without passing through the filter 9 to the environment.

In the first container 2 components of the fluid including air, gaseous water and gaseous oil are at least partly separated from liquid and solid components contained in the fluid by the filter 9. During regular operation cleaned air is exhausted through the silencer 8 to the environment, while liquid and solid components of the fluid are collected at the bottom of the first container 2.

The liquid and solid components of the fluid collected at bottom of the first container 2 are temporarily transferred and stored in a void or volume 10 confined between two end pieces 12, 13 or caps of the throttle device 6 comprising the separator valve. The two end pieces 12, 13 or caps of the separator valve are fixedly connected with each other by a rod or formed in one piece and have a distance between their opposite surfaces that is larger than the distance between the two respective openings or valve seats of the separator valve in the bottom of the first container 2 and the top of the second container 3. Due to their fixed connection both end pieces 12, 13 can be operated simultaneously. In an idle position, the separator valve is pushed in an upward position by means of a concentrically arranged spring 17 such that the opening in the second container 3 is closed by the respective end piece 13, while the opening in the first container 2 is opened. In this position liquid components of the fluid at the bottom of the first container 2 can enter into the volume 10 of the separator valve formed in the wall 5 between the first container 2 and the second container 3.

The separator valve provides a controllable fluid connection and separation between the first container 2 and the second container 3. The controllable connection helps to minimize influence of fluid such as purge air supplied through an intake port 7 on the treatment of the fluid in the second container 3. When the connection between the first container 2 and the second container 3 is open pressure swings and high airflow may cool the fluid in the second container 3 which may have a negative effect on the treatment process of the fluid taking place in the second container 3. Furthermore, high pressure of the purge air in the first container 2 may urge exhaustion of fluid contained in the second container 3 including an increased undesired oil emission. By closing the separator valve the second container 3 can be isolated from the first container 2 and the physical conditions therein.

Operation of the separator valve is controlled by a piston 19 arranged in the first container 2 above the separator valve which can be operated by a control signal. The control signal can be a time signal that controls the position of the separator valve according to time intervals during which the piston 19 is activated or released. For example, an air dryer or compressor which is connected with the device can send the control signal to actuate the piston 19 and to thereby open the lower valve seat in the second container 3 for a certain time interval. This has the effect that collected fluid inside the volume 10 between the two valve seats at the openings in the first container 2 and the second container 3, respectively, is transported to the second container 3. The transfer of fluid into the second container 3 is supported by an overpressure in the first container 2 during the time interval, when the piston 19 is actuated so that the lower seat of the valve and, simultaneously, the upper seat of the valve in the first container 2 are open. The time interval may correspond to or include a time period during which the airdryer or compressor connected to the device produces compressed purge air that is supplied to the device.

A continued actuation and movement of the piston 19 during the time interval has the effect that the upper seat of the valve is closed while the lower seat of the valve remains open and the end piece of the valve in the second container 3 reaches a maximum extension from the corresponding valve seat. Then at the beginning of a subsequent air drying cycle, when the compressor is again switched on and the time interval during which the air dryer sends the actuation signal ends, the valve and the piston are moved back to the idle position by the spring. This has the effect that the closed upper valve seat opens and the lower valve seat closes.

During the next on-load phase, when the upper valve seat is opened and the lower valve seat is closed, a further amount of liquid collected at the bottom of the first container 2 flows into the valve inner volume 10 and remains there until the next opening of the lower valve seat.

Alternatively, the separator valve of the throttle device 6 can be provided without a piston and operation of the separator valve can be effected directly by pressurized fluid entering the first container 2 and pushing the end piece 12 of the separator valve to open the valve if the pressure of the fluid in the first container 2 is sufficiently high.

The fluid collected in the inner volume 10 of the separator valve which is transferred to the second container 3 contains a mixture of components including water, oil and an oil-in-water emulsion or mixture. The second container 3 is configured to evaporate the water component of the fluid and therefore separate the water from the oil and other components in the fluid such as particles. The evaporated water is selectively discarded to the environment through an exhaust 20 of the second container 3.

Under humid climatic conditions the liquid components of the fluid collected in the second container 3 contain a high portion of water. For an efficient evaporation of the water in the fluid a high temperature and a large evaporation surface of the fluid are preferred. In order to achieve efficient evaporation conditions an electric heater 21 is arranged at the bottom of the second container 3 to heat the fluid in the second container 3. The electric heater 21 is controlled by a thermoswitch which permits to control the temperature of the fluid in the second container 3 in a narrow temperature range. The temperature range and the minimum and maximum temperature of the range are set so that the temperature in the range is sufficient for an efficient water evaporation, but low enough to avoid significant evaporation of oil components in the fluid.

Furthermore, the second container 3 includes a perforated primary bubbling plate 23 at the bottom through which a gas such as preheated air is forced which is supplied for example from a container comprising compressed air outside of the device. The bubbles of the gas formed when the gas passes through the perforated primary bubbling plate 23 are distributed in the fluid contained in the second container 3 and provide for a large evaporation surface of the the fluid which enhances evaporation of the water component in the fluid. The bubbles can also promote the breaking of emulsions or mixtures in the fluid. For further enhanced performance, a secondary bubbling plate 24 is provided over the perforated primary bubbling plate 23. Gas bubbles are rising through the secondary bubbling plate 24 and towards the upper surface of the fluid. During the rise the gas bubbles absorb water and enter the gaseous atmosphere above the level of the liquid fluid which further enhances the evaporation of the water component in the fluid. The H2O saturated air above the level of the liquid fluid in the second container 3 is exhausted to the environment through the exhaust 20. Optionally, a wave shield 25 which prevents a direct contact of the liquid fluid components with the exhaust 20 is provided. The wave shield 25 avoids draining of fluid from the second container 3 during braking, sharp cornering, or climbing of the vehicle in which the device is mounted.

At the top of the second container 3 connected to the exhaust 20 a filter 27 is arranged. The exhaust 20 and the filter 27 are designed in a way that any condensate of gaseous oil which is transported towards the exhaust 20 is caught in the filter 27 which can be for example a coalescence type filter. Hence, any condensate of gaseous oil collected in the filter 27 flows back to the liquid components of the fluid in the second container 3. Furthermore, the exhaust 20 has a vertical orientation in order to prevent any water or dust from entering the second container 3 from the outside.

Figure 2:
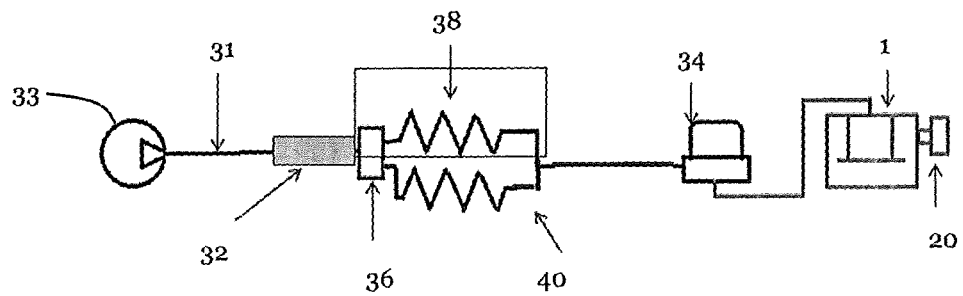
FIG. 2 shows an example of a system for separating fluid components according to an embodiment.

A system for separating fluid components as shown in FIG. 2 may comprise the device 1 described with respect to FIG. 1. In the system, in addition to the electric heater 21 provided in the device 1 according to the first embodiment heated compressed air of a compressor discharge line 31 can be used as an additional heat source for heating the fluid in the second container 3 for evaporation. The compressor discharge line 31 may at least over part of its length comprise a heat isolation 32. Alternatively or additionally to heated compressed air from the compressor 33 it is also possible to use tempered cooling liquid of the vehicle for heating of the fluid in the second container 3. The use of any of these secondary heat sources permits to reduce the consumption of electric power by the electric heater 21.

As shown in FIG. 2 compressed air generated by the compressor 33 is supplied to an air treatment unit 34 which directs the heated compressed air to one or more consumers of the compressed air such as a brake system of the vehicle. The compressed air is directed by a split valve 36 either to a heat exchanger 38 which is coupled with the first or the second container 1, 3 for transferring heat to the fluid in the first or second container 1, 3 or to a by-pass heat exchanger 40 which is in thermal contact with the the environment. According to the embodiment shown in FIG. 1, a spiral shaped tube 39 surrounding the second container 3 is arranged in contact with the second container 3 to form the heat exchanger 38.

The split valve 36 can be operated such that the heated compressed air from the discharge line 31 is supplied to the heat exchanger 38 of the device 1 when energy is necessary to heat the fluid in the second container 3 and otherwise is operated such that the heated compressed air is supplied to the by-pass heat exchanger 40 when heating of the fluid in the second container 3 is not necessary or desired, for example, when the temperature of the fluid in the second container 3 of the device 1 exceeded a threshold.

As an example illustrating the separation of the water component of the fluid from the fluid by evaporation in the second container 3 a temperature of approximately 70° C. is targeted for the fluid in the second container 3 to achieve an efficient water evaporation and an acceptably low evaporation and emission of oil components of the fluid from the second container 3.

For operating the split valve 36 a thermal actuator such as a wax motor 42 which comprises an expansion material that is capable to expand and shrink depending on the temperature can be connected with the split valve 36. When the temperature of the fluid in the second container 3 is below a threshold temperature, the expansion material of the wax motor 42 shrinks and moves the split valve 36 into a first position in which the heat exchanger 38 coupled with the second container 3 is supplied with heated compressed air. When the temperature is higher than the threshold temperature, the expansion material of the wax motor 42 extends and moves the split valve 36 into a second position in which the heat exchanger 38 coupled with the second container 3 is not supplied with heated compressed air and in which the heated compressed air from the compressor 33 is supplied to the by-pass heat exchanger 40.

The evaporation process of the water component in the fluid contained in the second container 3 when the vehicle on which the device 1 for separating fluid components from purge air is mounted is started under cold conditions may proceed as follows. At cold conditions before the vehicle start the device 1 is at ambient temperature. The fluid inside the second container 3 and also the fluid which is supplied to the device 1 at the start of the vehicle from its compressor and airdryer is usually below the threshold temperature for acceptable water evaporation conditions. In this situation, the electric heater 21 of the second container 3 is switched on and the wax motor 42 has moved according to the low temperatures of the second container 3 the split valve 36 into a position in which the heat exchanger 38 coupled with the second container 3 is supplied with compressed air. In order to quickly heat the fluid in the second container 3 both heat sources supply heat to the fluid in second container 3 until the temperature of the fluid passes the threshold temperature for efficient water evaporation where the electric heater 21 switches off.

When the electric heater 21 switches off the temperature of the fluid in the second container 3 is still below the predetermined maximum temperature. Sine the wax motor 42 keeps the split valve 36 open the supply of heated compressed air to the second chamber 3 continues. The supply of heated compressed air continues until the temperature of the fluid passes a predetermined maximum temperature. Then the expansion material of the wax motor 42 has expanded so far that the split valve 36 shuts down the flow of heated compressed air to the device heat exchanger 38 but connects the discharge line 31 with the by-pass heat exchanger 40. The temperature of the fluid in the second container 3 then decreases due to continuous evaporation and exhaust of evaporated water through the exhaust 20 and heat dissipation below the threshold temperature. Then the expansion material in the wax motor 42 has shrinked so that the split valve 36 reconnect the discharge line 30 with the device heat exchanger 38 and heat is supplied again to the second container 3.

If the power demand for the evaporation process is over the capability of the heat supplied by the heated compressed air from the discharge line 31, for example, if an extreme amount of water is collected by the device 1 due to very humid weather conditions and the temperature of the fluid continues to decrease the electric switch turns on the electric heater 21 and heat from both heat sources can be supplied to the second container 3. If the temperature then passes the threshold temperature the electric heater 21 switches off again.

The described control process provides that the use of waste heat such as transported in the heated compressed air from the discharge line 31 is priorized over use of electric power. For robust operation, it is necessary that the temperature of the heated compressed air at the split valve 36 is higher than the target temperature of the fluid. This can be achieved by appropriate dimensioning of the length of the discharge line and a corresponding heat isolation 32.

Figure 3:
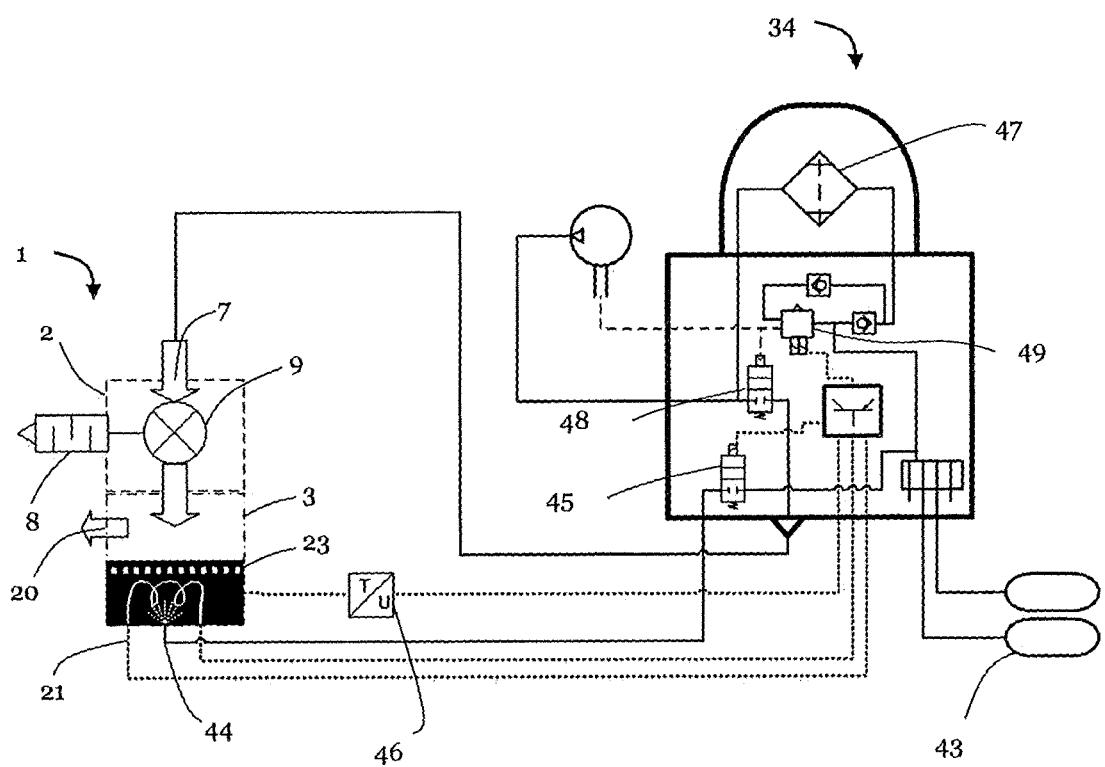
FIG. 3 shows an example of a system for separating fluid components according to another embodiment.

A system for separating fluid components as shown in FIG. 3 may comprise the device 1 described with respect to FIG. 1. The system comprises an air treatment unit 34 which comprises one or more drying agents and an oil filter 47 to purify and dry compressed air from a container 43 for compressed air. The container 43 which can be connected to a compressor supplies compressed air which is passed through the drying agents and the oil filter 47 and subsequently is exhausted through a valve 48 of the air treatment unit 34 and then supplied to the intake port 7 of the first container 2 where a separation of one or more components of the fluid is performed.

From the container 43 compressed air can also be supplied via the air treatment unit 34 to a fluid supply 44 connected to the second container 3. The fluid supply 44 may comprise one or more openings in the second container 3 that are provided to generate air bubbles introduced in the fluid. The compressed air from the container 43 can be used to increase the surface of one of the fluid components, in particular, of oil contained in the fluid so as to break an emulsion or mixture of water and oil contained in the fluid and to enhance evaporation of the water component in the fluid due to the increased fluid surface.

The second container 3 also comprises the bubbling plate 23 described above with respect to the first embodiment. The bubbles of the gas formed when the compressed air passes through the perforated bubbling plate 23 are distributed in the fluid contained in the second container 3 and provide for a large evaporation surface of the fluid which enhances evaporation of the water component in the fluid.

Supply of compressed air to the container 3 is controlled by the air treatment unit 34 through a valve 45 arranged to open or close the supply line to the fluid supply 44. The supply of pressurized air through the fluid supply 44 can be controlled, for example, in correspondence with the supply of pressurized air though the intake port 7 into the first container 2, i.e. in time intervals when pressurized air has been supplied to the device 1 for separating one or more of its components such as water and when evaporation of water in the second container 3 is required. A controller 49 of the air treatment unit 34 may also apply electric power to the electric heater 21 at corresponding time intervals during which evaporation of water in the second container 3 is required and when the temperature of the fluid in the second container needs be increased in order to obtain appropriate evaporation conditions as determined by a temperature sensor 46.

Alternatively, the system shown in FIG. 3 may have a modified configuration in which the container for compressed air 43 is directly connected via a supply line with the fluid supply 44 of the second container 3 without passing through the air treatment unit 34. A supply of air from the container for compressed air 43 can be controlled according to the modified configuration by a valve, check valve or throttle provided in the supply line. The valve or throttle can be controlled by controller 49 of the air treatment unit 34.

The system shown in FIG. 3 may also comprise one or more of the other features described above with regard to the embodiments shown in FIGS. 1 and 2 or the remaining figures.

Figure 4:
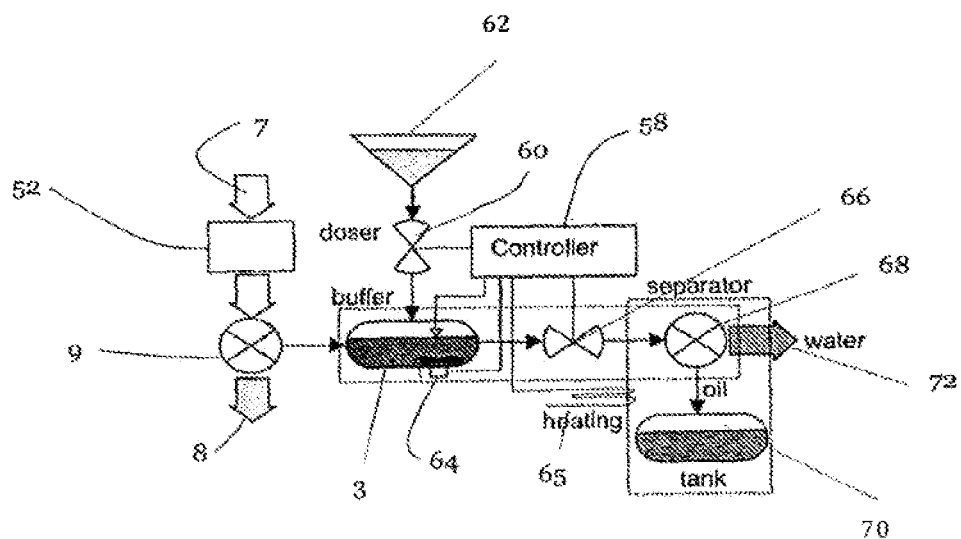
FIG. 4 shows an example of a device for separating fluid components according to a second embodiment.

Another example of a device for separating fluid components from a fluid according to a second embodiment is shown schematically in FIG. 4. The device can have the same or a similar structure as the device 1 according to the first embodiment shown in FIG. 1. The same or similar features are denoted by the same reference numerals. Similar to the device according to the first embodiment the device according to the second embodiment may include a housing 1 with a first container 2 and a second container 3 that are separated by a wall 5 in which a throttle device 6 is arranged. However, this is optional and the throttle device 6 and the separate containers can be omitted as well.

At an intake port 7 of the device a fluid such as purge air from a compressor which may include air, gaseous and liquid water, gaseous and liquid oil, water/oil emulsion or mixture and solid particles can be supplied to the first container 2. The supplied fluid can be cooled by an intercooler 52 which is arranged upstream the device and is used to pre-treat the fluid by condensation of gaseous components in the fluid due to cooling in order to increase the amount of the liquid components in the fluid and reduce the amount of gaseous components in the fluid, in particular, oil and water.

Similar to the first embodiment the first container 2 comprises at least one filter 9 such as a coalescence filter for separating one or more gaseous components from fluid. Additional filters or other means for separating one or more components of the fluid from the fluid such as a spiral flow path or baffle plates can be arranged in the first container 2 as well. In particular, the first container 2 may comprise one or more single layer or multi-layered coalescence filters to separate one or more gaseous components from the fluid and promote formation of droplets of other components such as oil or water on its surface. Gaseous components of the fluid such as cleaned air is exhausted through a silencer 8 to the environment. The remaining fluid including mainly liquid components and, possibly, one or more emulsions or mixtures formed by two or more liquid components of the fluid are collected in the second container 3.

The second container 3 of the second embodiment is arranged for processing an emulsion or mixture included in the fluid. In particular, the second container 3 is connected to a controller 58 and a doser 60. The controller 58 is configured to send a signal to the doser 60 to supply a specified amount of a substance 62 such as an emulsion or mixture breaker substance into the second container 3. The emulsion or mixture breaker substance 62 can be for example a fluid, in particular a gaseous or liquid fluid or a solid but also a gas such as air. The emulsion or mixture breaker substance 62 splits up the emulsion or mixture into two or more separate components. For example, an emulsion or mixture comprising water and oil is separated into water and oil floating on the water. Furthermore, in the second container 3 a mixer 64 is provided that is configured to distributes the emulsion or mixture breaker substance 62 in the fluid. The mixer 64 as well as a heating device 65 which is provided to heat the fluid in the second container 3 are controlled by the controller 58. After the emulsion or mixture breaking process is finished, the controller 58 provides a signal to a drain valve 66 to open so that the fluid including the one or more components which have been treated with the emulsion or mixture breaker substance 62 is drained to a separator device 68. The separator device 68 is configured to separate one of the components of the fluid such as a component comprising oil from another component comprising water and collect the separated component in a reservoir 70. The other component of the fluid such as water can be released to the environment through an outlet 72. Since process involves liquid water an appropriate heating of the fluid is required for operation at low temperatures.

The separator device 68 and the reservoir 70 can be integrated into one container. For example, fibrous oilophilic polypropilene which absorbs oil can be used as the separator device 68 to separate a component such as oil from the fluid. Another component of the fluid such as water, which is not absorbed by the separator device 68 is released to through an outlet 72. Instead of the above described absorbing material the separator device 68 may also include one or more of one or more filters, membranes and other absorbing materials for separating one or more components of the fluid from the fluid.

In addition, the second container 3 may comprise one or more single layer or multi-layered coalescence filters. Alternatively or additionally, the first container 2 or the second container 3 may be arranged to slow down air velocity by means of an expansion volume in the first or second container 2, 3 or a throttle device to promote formation of droplets of one or more components of the fluid. A plurality of baffle plates or a combination of these devices can be used in one or both of the first container 2 or the second container 3.

Figure 5:
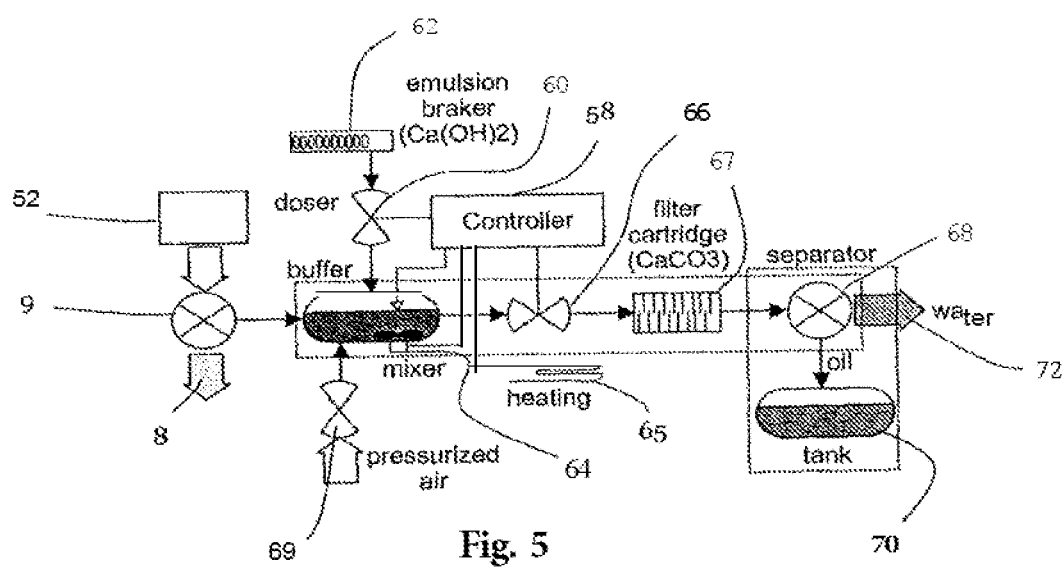
FIG. 5 shows an example of a device for separating fluid components according to a third embodiment.

Another example of a device for separating fluid components from a fluid according to a third embodiment is shown in FIG. 5. It includes a similar structure like the device according to the first and second embodiment shown in FIGS. 1 and 3, respectively. The same parts as in FIGS. 1 and 3 are denoted by the same reference signs. Similar to the device according to the third embodiment includes a housing with a first container 2 and a second container 3. A throttle device as described can be provided between the first and second container 2, 3. According to the embodiment shown in FIG. 5, the configuration of the first container 2 corresponds to the configuration of the first container 2 shown in the embodiment according to FIG. 4.

The configuration of the second container 3 of the device according to the third embodiment is similar to the configuration of the second container 3 according to the second embodiment but includes some differences. in contrast to the second embodiment a supply of a solid emulsion or mixture breaker substance 62 such as a salt (Ca(OH)2) by the doser 60 is provided. The salt splits up an emulsion or mixture comprising water and oil into water and oil floating on the water. In addition pressurized air can be introduced into the second container 3 through a valve 69. Furthermore, in the second container 3 after the emulsion or mixture breaking process the fluid is provided through the valve to a filter cartridge 67 including (CaCO3) as a material for filtering solid particles before the fluid is introduced in the separator device 68. The separator device 68 is configured similar to the separator device 68 of the second embodiment but is may also be configured differently. Furthermore, according to the third embodiment pressurized air may be supplied to the fluid.

Figure 6:
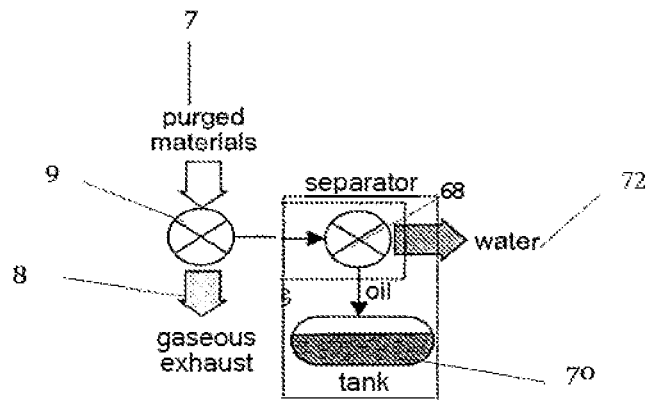
FIG. 6 shows an example of a device for separating fluid components according to a fourth embodiment.

Another example of a device for separating fluid components from a fluid according to a fourth embodiment is shown in FIG. 6. The device according to the fourth embodiment comprises a simpler structure compared to the previously described embodiments.

The same parts as in FIGS. 1, 3 and 4 are denoted by the same reference signs. Similar to the device according to the first and second embodiment the device according to the fourth embodiment includes a housing with a first container 2 and a second container 3. A throtte device as described above can be provided between the first and second container 2, 3 although not shown in FIG. 6. According to the embodiment shown in FIG. 6, the configuration of the first container 2 corresponds to the configuration of the first container 2 described with regard to the embodiments according to FIGS. 1, 4 and 5.

In the device according to the fourth embodiment a supply of an emulsion or mixture breaking substance is not provided. Instead, in the second container 3 a separator device 68 is provided which is configured to separate at least one of the components of the fluid contained in the second container 3 such as a component comprising oil from another component comprising water and collect the separated component in a reservoir 70. The other component of the fluid such as water can be drained to the environment through an outlet 72.

Figure 7:
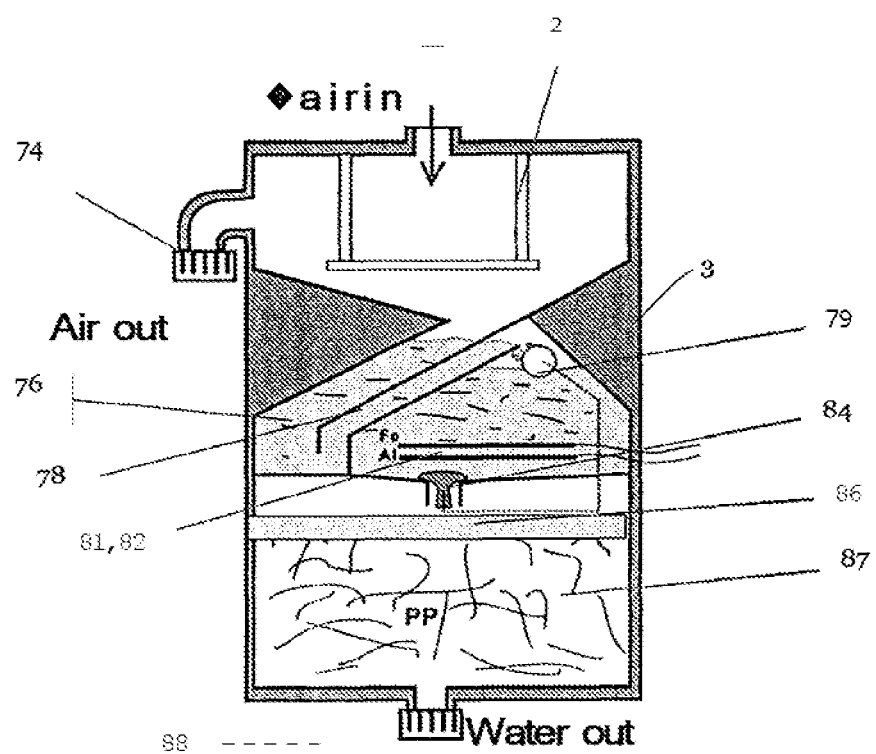
FIG. 7 shows an example of a device for separating fluid components according to a fifth embodiment.

Another example of a device for separating fluid components from a fluid according to a fifth embodiment is shown in FIG. 7. The device according to the fifth embodiment comprises a second container 3 which has a different configuration than in the previously shown embodiments and is arranged for generating an emulsion or mixture breaking substance by electrolysis.

The same parts as in FIGS. 1-6 are designated by the same reference signs. Similar to the device according to the first to fourth embodiment the device according to the fifth embodiment includes a housing with a first container 2 and a second container 3. A throtte device as described above can be provided between the first and second container 2, 3 although not shown in FIG. 7. According to the fifth embodiment as shown in FIG. 7, the configuration of the first container 2 corresponds to the configuration of the first container 2 shown in the embodiments previously described. Air or another gaseous component separated from the fluid in the second container can be exhausted through an exhaust 74 connected to the second container 2

The second container 3 is arranged for receiving a fluid provided from the first container 2. The fluid can be a mixture of water, oil and may include a stabile water oil emulsion or mixture. The second container 3 comprises a conical shape and is connected to a channel 76 which is formed by a separation wall 78 of the second container 3. The separation wall 78 is used to form a feeding channel. The conical shape of of the second container 3 provides an interface to a float 79. At the bottom of the second container 3 two electrodes 81, 82 are positioned forming an anode and a cathode. For example the anode may be formed of aluminium and and the cathode may be formed of iron. The electrodes 81, 82 are separated by an insulation material to avoid a short circuit. The electrodes 81, 82 are connected to an electric potential and therefore an electric current is generated when a voltage is applied between the electrodes 81, 82. The electric current generates microscopic particles of AlOH which are able to extract and collect microscopic oil droplets from an oil in water emulsion or mixture. Hence, electrolysis can be used for separating a stabil emulsion of water and oil into its respective separated components. This process run continuously until the float 79 at the top of the fluid reaches a specified level. The float 79 is connected with a drain valve 84 which opens when the float reaches a predetermined level in the the second container 3. Then the fluid which includes a mixture of water, oil and solid AlOH particles is released from the second container 3. The drained fluid and the solid particles of AlOH are processed through a coarse filter 86 where AlOH particles are removed from the fluid. Water and oil are processed through to an oliophilic, hydrophobic material 87 of fibrous polypropilene or a similar material. The fibrous material is able to selectively absorb an oil component of the fluid, while at the same time water passes through it. Since the water is sufficiently purified it can be drained to the environment through an outlet port 88.

Figure 8:
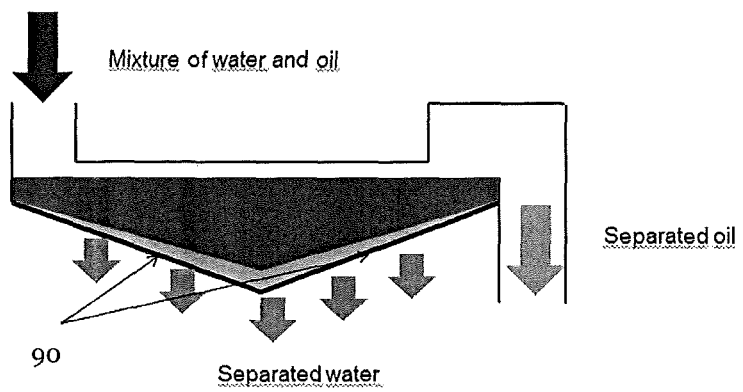
FIG. 8 shows an example of a device for separating fluid components according to a sixth embodiment.
Figure 9:
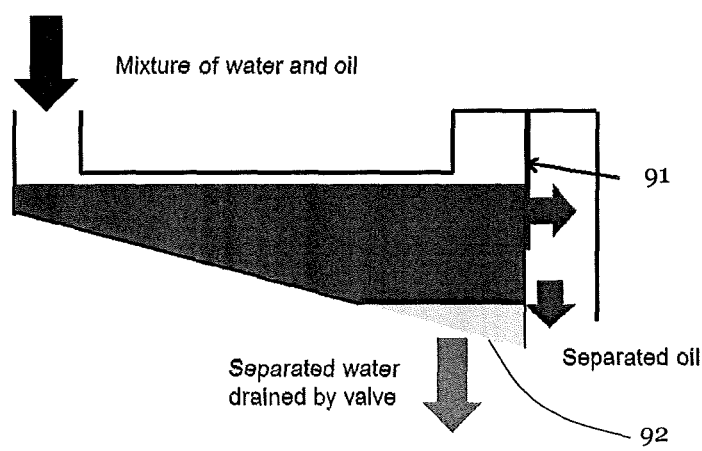
FIG. 9 shows an example of a device for separating fluid components according to a seventh embodiment.

FIGS. 8 and 9 describe two embodiments of separator devices including at least one membrane 90 which is configured to separate water from oil. These separator devices can be used in the fluid separation devices according to the previously described embodiments.

According to the embodiment of the separator device shown in FIG. 8 a container comprises a hydrophilic and oilophobic separation membrane 90. In this case water supplied to the container and the membrane 90 passes through the membrane surface, while oil is retained at the membrane surface. The surface of the membrane 90 can be configured to direct the retained oil to an oil reservoir. The container and the membrane 90 provided therein are designed in a way so that a cavity or recess is formed which comprises the membrane 90 where the water collects due to gravity. In this way a transfer of water to the oil reservoir can be avoided. This type of membrane solution is favourable as naturally oil tends to float on top of water therefore contact of water to membrane surface is provided.

According to the embodiment of the separator device shown in FIG. 9 a container comprises a vertically positioned oliophilic and hydrophobic membrane 91. Water naturally tends to sink towards the bottom of the reservoir, while the oil floats on top of the water. The membrane 91 which is arranged at the upper part of the container wall or forms a part thereof retains water, while the oil can be released through the membrane 91 to an oil reservoir. This separator device includes a level control which is configured to control the water level in the container to become not too high and the oil floating on the water cannot get into contact with the membrane in case of a too high water level. At the bottom the container comprises a valve 92 for draining the water.

In the device according to the above described embodiments and, in particular, in the first container 2 but also in the second container 3 different types of filters and filtration methods can be used. For example depending on the requirements one or more single-layer or multi-layer coalescence filters, a container design which causes due to an expansion volume or a throttle provided in the container a slowing down of the velocity of a fluid stream resulting in the formation of droplets of fluid components which fall down to the bottom of the container by gravity, an arrangement of baffle plates, a cyclonic separator or a combination of these devices and functions can be included.

Figure 10:
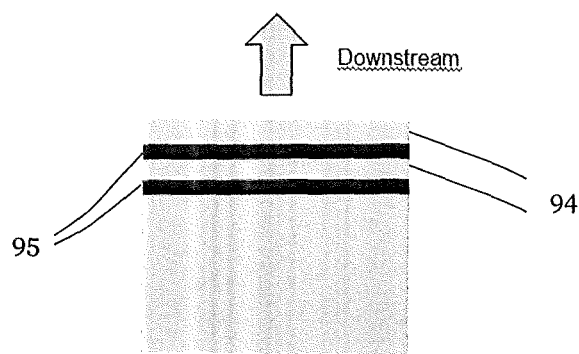
FIG. 10 shows an example of a filter device according to an embodiment.
Figure 10:

FIG. 10 shows a cross-section of an embodiment of a filter material sheet which can be used in one or more of the filters described above. The filter material sheet comprises several layers including at least two filter material layers 94 alternating with at least two metal or plastic woven mesh layers 95 and being attached to a thick filter material layer which may be of the same material as the two filter material layers. The two metal or plastic woven mesh layers 95 may comprises 0.2 mm filament thickness. This combination of layers has shown a very good separation performance.

Figure 11:
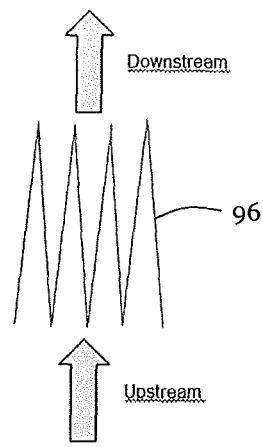
FIG. 11 shows examples of filter devices according to embodiments.
Figure 11:
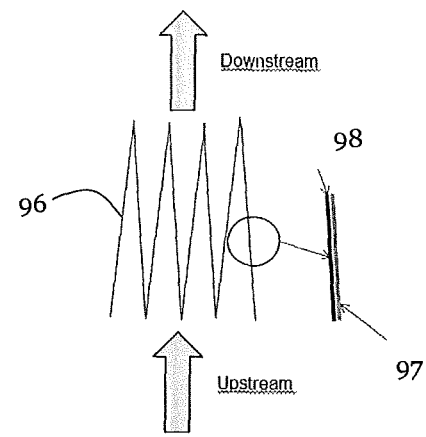
Figure 11:
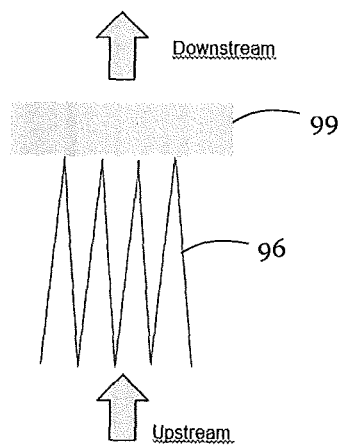
Figure 11:
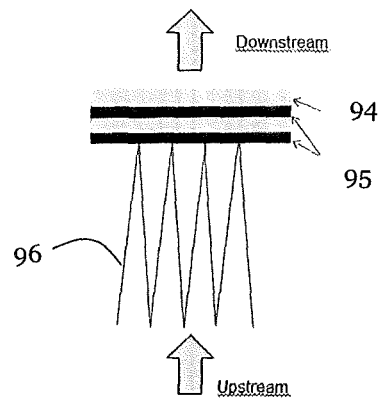

Also a filter comprising a pleated filter material sheet 96 as shown in FIG. 11 can be used can be used in one or more of the filters described in the previous embodiments. FIG. 11 shows at the top right side a filter comprising a pleated filter material sheet 96, wherein the pleated filter material sheet 96 comprises a coarse filter material drainage layer 97 on top of a fine filter material layer 98. In the embodiment shown in FIG. 11 at the bottom left a pleated filter material sheet 96 is combined with a one or more coarse filter material drainage layers 99. As shown in FIG. 11 at the bottom right it is also possible to combine a pleated filter material sheet with a filter material sheet which comprises several layers including at least two filter material layers 94 alternating with at least two metal or plastic woven mesh layers 95 as described in FIG. 10.

The filters described above with regard to FIGS. 10 and 11 may comprise coalescence filter material sheets which can be positioned across the flow direction of a fluid. Coalescence filter material sheets are configured such that droplets of a fluid passed through the filter are caught in the filter material sheet and larger droplets are coalesced at an outer surface of the filter material sheet.

A filter material sheet can be positioned with respect to a flow direction of a fluid in a device in different ways. For example, if a filter comprises a cylindrical design a fluid may be conducted through a filter material sheet provided at the top or the bottom surface of the cylinder and may then after having passed the filter material sheet at the top or the bottom surface of the cylinder exit the filter through the side wall of the filter. Alternatively, the flow of the fluid may be inserted into the filter through the side wall of the filter and then be streamed through the filter material sheets at the top and bottom sides of the filter.

Furthermore, a filter material sheet may be arranged under an angle with regard to the flow direction of the fluid. The angle can in a range between 0 and 90°, including 10°, 45°, 60°, 75° or 90°.

Furthermore a filter may comprise one or several layers of filter media sheet that are rolled on a perforated substrate.

Figure 12:
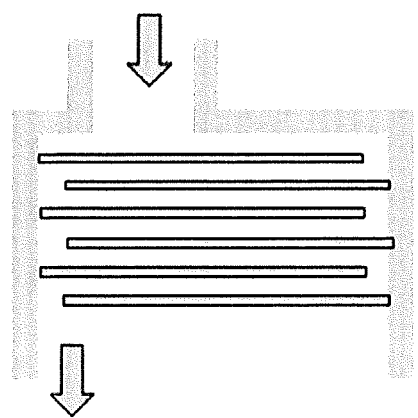
FIG. 12 shows an example a device for separating fluid components according to an embodiment.

FIG. 12 shows an arrangement of baffle plates mounted in a container across the flow of the fluid. The arrangement of baffle plates baffle plates can be positioned, for example, close to the inlet to the first container 2 or the second container 3 described above in relation with several embodiments. According to the embodiment shown in FIG. 12 several baffle plates are arranged in parallel across a flow direction of the fluid and offset with respect to each other in a direction perpendicular with respect to the flow direction of the fluid so that the fluid stream is forced to meander around the baffle plates and to change direction rapidly which causes droplets of one or more components of a fluid to collide with the baffle plates where they are collected there and separated from the fluid.

Figure 13:
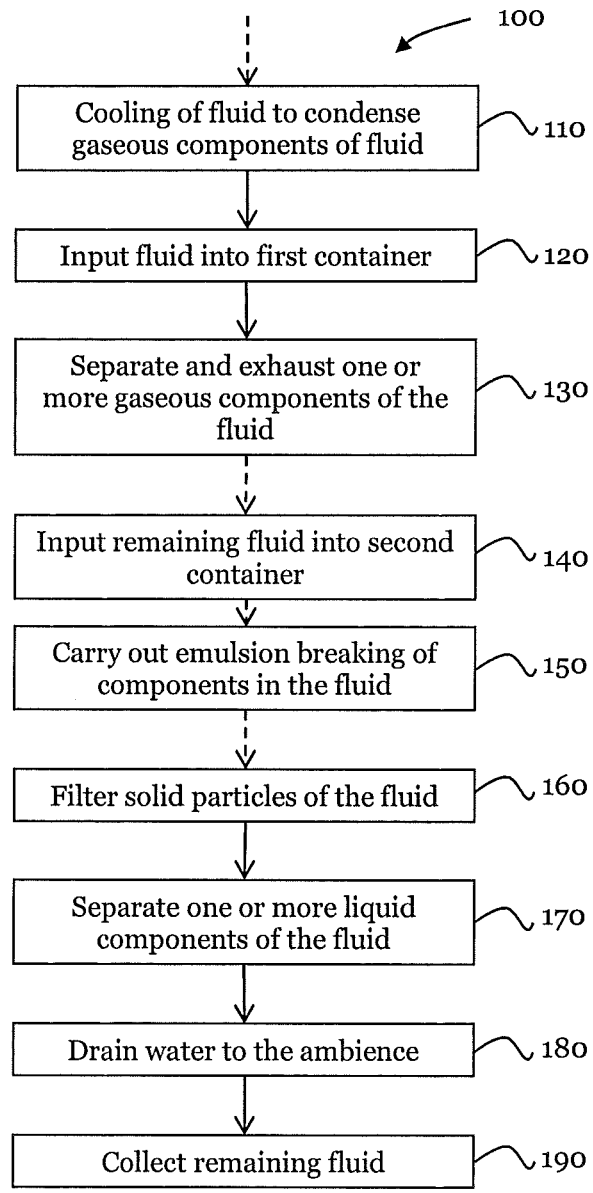
FIG. 13 shows a method of separating components from a fluid according to an embodiment.

FIG. 13 describes an exemplifying method of separating one or more components of a fluid in order to purify one or more components and exhaust or drain them and collect and dispose other components of the fluid. The method can be carried out in one or several devices according to embodiments previously described. According to the method 100 in a first step 120 a fluid that, for example, contains a purge gas from an air dryer or compressor of a vehicle is introduced into a first container of a device. The fluid may contain gaseous water and oil as well as liquid water and droplets of oil and also solid particles. Optionally, the fluid may have been cooled in a previous step 110 in order to condense gaseous components of the fluid such as gaseous oil at least partly. This cooling step may have been carried out outside of the first container in an intercooler. In a second step 130 of the method one or more gaseous components of the fluid are at least partly separated from the fluid using a filtering method such as coalescence filtering, droplet formation due to decrease of flow speed of the fluid in an expansion volume, separation of fluid components by baffle plates, or other filter methods described above or a combination thereof. The one or more gaseous components may be exhausted to the environment after the separation from the fluid. In a further optional step 140 (indicated by a broken line) the remaining fluid which includes mainly liquid water and oil as well as solid particles is transferred to a second container. Optionally, in a subsequent step 150 an emulsion or mixture breaking process may be performed which includes supplying an emulsion or mixture breaking substance into the second container or using electrolysis to form the emulsion or mixture breaking substance directly in the container comprising the fluid as described above. As a further option solid particles contained in the fluid are filtered or absorbed in a subsequent step 160. Then, in a further step 170 one or more liquid components contained in the fluid are separated from the fluid. The separating may be performed by using selective filtration, absorption or evaporation of one or more components of the fluid or a combination of these steps. The separating can be carried out as described above with reference to other embodiments. Thereafter, in step 180 one or more purified components of the fluid like water can be drained to the environment and the remaining components of the fluid including oil can be collected in step 190. The sequence of the method steps described can be varied.

Multiple changes can be provided to the embodiments described above without leaving the scope of the invention.

REFERENCE NUMERALS 1 housing
2 first container
3 second container
5 wall
6 throttle device
7 intake port
8 silencer
9 coalescence filter
10 void
11 safety bypass valve
12 end piece of valve
13 end piece of valve
17 spring
19 piston
20 exhaust
21 electric heater
23 bubbling plate
24 secondary bubbling plate
25 wave shield
27 filter
31 discharge line
32 discharge line heat isolation
33 compressor
34 air processing unit
36 split valve
38 heat exchanger
39 spiral shaped tube
40 bypass heat exchanger
42 wax motor
43 container for compressed air
44 fluid supply
45 valve
46 temperature sensor
47 drying agents or oil filter
48 valve
49 controller
52 intercooler
58 controller
60 doser
62 emulsion or mixture breaker substance
64 mixer
65 heating device
66 drain valve
67 filter cartridge
68 separator device
69 pressurized air valve
70 reservoir
72 outlet
74 exhaust
76 channel
78 separation wall
79 float
81 electrode
82 electrodes
84 drain valve
86 filter
87 oliophilic, hydrophobic material
88 outlet port
90 membrane
91 membrane
92 valve
94 filter material layers
95 woven mesh layer
96 pleated filter material sheet
97 coarse filter material drainage layer
98 fine filter material layer
99 coarse filter material drainage layers

The invention claimed is:

1. A device for separating a fluid component from a fluid, the device comprising:
   a first container configured to contain the fluid, and separate at least a part of one or more components contained in the fluid from the fluid by evaporation, wherein the first container comprises:
      one or more openings configured to receive a substance into the fluid in the first container for breaking an emulsion or mixture of two or more components contained in the fluid; and
   a second container configured to separate at least a part of one or more components contained in the fluid from the fluid, wherein the second container comprises:
      an exhaust through which the at least part of the one or more separated components can be exhausted, wherein
      the first and the second container are interconnected by a throttle device disposed in a common wall between the first and the second container and configured to throttle a transfer of at least a part of the fluid from the first container into the second container or from the second container into the first container.

2. The device according to claim 1, wherein
   the first container comprises a heating device configured to increase a temperature of the fluid in order to enhance evaporation of the one or more components from the fluid, and
   the heating device is controllable to maintain the temperature of the fluid above a threshold temperature or in a temperature range.

3. The device according to claim 2, wherein
   the heating device includes one or both of an electrical heating device or a heat exchanger for conducting a fluid such as a gas or a liquid to the first container, and
   the heat exchanger is in contact with the first container to exchange heat with the fluid contained therein.

4. The device according to claim 1, wherein
   the first container comprises at least one perforated sheet, board or plate through which a gas or gas bubbles are supplied to the fluid to increase a surface of the fluid and an evaporation rate of one or more components of the fluid.

5. The device according to claim 1, further comprising:
   a heating device for heating the substance supplied to the fluid in the first container.

6. The device according to claim 1, wherein
   the throttle device comprises one or more of: a check valve, a drain valve, a filter, a membrane, an absorber for one or more components of the fluid, an opening in a wall between the first container and the second container, or an opening in a wall between the first container and the second container having an increasing or decreasing diameter.

7. The device according to claim 1, wherein
   the throttle device is adapted for actuation in dependence of a supply of a fluid such as compressed air to the first or second container so as to open to supply fluid from the first container to the second container or from the second container into the first container.

8. The device according to claim 1, wherein
   a void for receiving at least a part of the fluid is formed between an opening in the first container and an opening in the second container.

9. The device according to claim 1, wherein
   one or both of the first container or the second container comprises one or more of one or more filters or one or more baffle plates arranged across a flow direction of the fluid or a spiral flow path for the fluid in which at least a part of one or more components contained in the fluid are separated from the fluid, and
   one or both of the first container or the second container further comprises an outlet to exhaust the separated at least a part of one or more components.

10. The device according to claim 1, wherein
    one or both of the first or the second container are arranged for containing the fluid and a substance supplied to one or both of the first or the second container by a supply connected to one or both of the first or the second container, respectively, wherein
    the substance is an emulsion or mixture breaker configured to at least partially split an emulsion or mixture of two or more components included in the fluid into two or more separate components of the fluid upon contact with the substance.

11. The device according to claim 1, wherein
    one or both of the first or the second container comprises at least one filter, a membrane or substance arranged to separate one or more components from the fluid,
    the filter, membrane or substance is configured to hold back one or more components of the fluid and let pass one or more other components of the fluid, and
    one or both of the first container or the second container further comprises an outlet to exhaust the separated one or more components passed through the filter.

12. A system for separating a fluid component from a fluid, comprising: a device according to claim 1; and
    a container for compressed air, the container for compressed air being connected to the first or second container of the device by a valve arranged to supply air to the first or second container.

13. The system according to claim 12, further comprising:
    an air treatment unit, connected to the device, to supply air treated in the air treatment unit to the device, and configured to control supply of compressed air from the container for compressed air to the device as an emulsion or mixture breaking agent.

14. A method of separating one or more components from a fluid, comprising the acts of:
    supplying the fluid into a first container;
    separating at least a part of one or more components contained in the fluid from the fluid, wherein the separating includes:
       supplying a substance for breaking an emulsion or mixture of two or more components contained in the fluid; and
       evaporating and exhausting at least part of the one or more components via a second container connected to the first container, wherein
       the first and the second container are interconnected by a throttle device disposed in a common wall between the first and the second container and configured to throttle a transfer of at least a part of the fluid from the first container into the second container or from the second container into the first container.

* * * * *